UNITED STATES PATENT OFFICE.

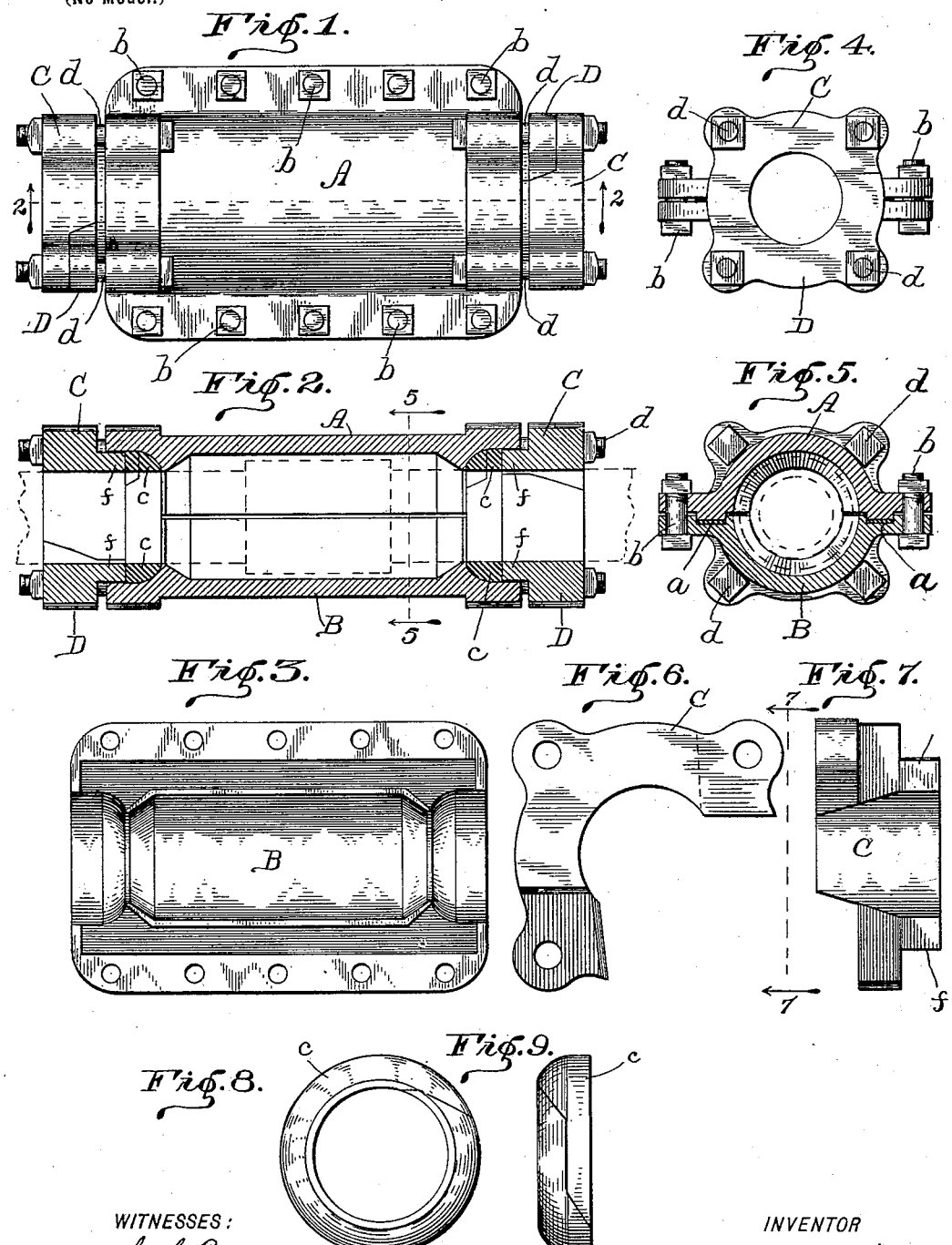

WALTER D. BEAVER, OF LEBANON, INDIANA.

LEAK-CLOSER.

SPECIFICATION forming part of Letters Patent No. 631,867, dated August 29, 1899.

Application filed June 16, 1899. Serial No. 720,827. (No model.)

*To all whom it may concern:*

Be it known that I, WALTER D. BEAVER, a citizen of the United States, residing at Lebanon, in the county of Boone and State of Indiana, have invented certain new and useful Improvements in Leak-Closers, of which the following is a specification.

The object of my said invention is to provide a means whereby a leaky joint in a gas or water pipe may be efficiently closed without disturbing the pipe, and relates to that class of leak-closers commonly called "split sleeves."

Said invention will be first fully described and the novel features thereof then pointed out in the claims.

Referring to the accompanying drawings, which are made a part hereof and on which similar reference characters indicate similar parts, Figure 1 is a top or plan view of a leak-closer embodying my said invention, all the parts being assembled together as when in use; Fig. 2, a vertical sectional view of the same as seen from the dotted line 2 2 in Fig. 1, the position of the pipe therein being indicated by means of dotted lines; Fig. 3, a top or plan view of the lower half of the main body of the leak-closer; Fig. 4, an end elevation of said leak-closer assembled as in Fig. 1; Fig. 5, a transverse sectional view thereof as seen from the dotted line 5 5 in Fig. 2; Fig. 6, a view of one portion of the end-packer; Fig. 7, a view of the part shown in Fig. 6 as seen from the dotted line 7 7 alongside the same; Fig. 8, a side elevation of one of the end packing-rings, and Fig. 9 an edge elevation of the same.

Said structure is composed of two central main body portions A and B, two end-packers, each composed of two halves C and D, flat joint-strips interposed between the two main parts, annular packing-rings adapted to be forced into suitable cavities in the ends of the main parts by the end-packers, and bolts which unite the several parts together.

As best shown in Figs. 3 and 5, the part B has suitable recesses within which packing-strips are laid running longitudinally thereof and extending around at the ends in position to come in contact with the annular packing-rings when the latter are forced in position. The upper half A has corresponding tongues which enter these grooves and press upon the joint-strips *a* therein, as best shown in Fig. 5, the two parts A and B being held together by the bolts *b*. These joint or packing strips or gaskets being confined within grooves or recesses are held securely in place and are not permitted to crush or spread out by the strain of the bolts uniting the parts A and B, as they would be were such parts provided with ordinary matching flat surfaces, while the ends being so formed as to extend around and come in contact with the end packing-rings all the interstices when the structure is assembled are completely and securely filled with packing material.

The end-packers are composed of mating halves C and D, which are alike and the form of which is clearly shown in Figs. 6 and 7. The end packing-rings *c* are placed in suitable recesses in the ends of the main structure A B, and an annular flange *f*, extending out from the parts C and D, follows said packing-rings into their recesses, where they are tightly held, as best shown in Fig. 2. The end-packer halves are halved together, the portions which come together overlapping each other, as shown, so that two of the four bolts *d*, by which these end-packers are held onto the main structure, each pass through both the parts of the end packer which they hold, as is clearly shown in the drawings. By this means the necessary circumferential construction is secured, and at the same time the parts are held firmly together without the necessity of using any special bolts for the purpose, the bolts *d*, which unite them to the main structure, serving both purposes. The annular packing-rings *c* are also made in a peculiar manner, as best shown in Fig. 9, being divided for a distance circumferentially and then cut apart by means of flaring cuts, so that the ends overlap each other for a considerable distance where they come together, thus preventing the possibility of a leak through any opening which might otherwise be left.

As will be observed, especially by an examination of Figs. 2 and 3, my joint-packer is chambered in the interior, the chamber being large enough to contain an ordinary sleeve-coupling, so that a leaky joint of this kind can be covered, as indicated by the dotted lines in Fig. 2. Of course said leak-closer can be applied over any ordinary break or leak in a pipe at any point in its length, as well as in the ends, where it is joined by a coupling.

Having thus fully described my said invention, what I claim as new, and desire to secure by Letters Patent, is—

1. The combination, in a leak-closer for pipes, of two semicylindrical main halves containing a chamber, one half having longitudinal recesses beside the chamber, and the other half longitudinal ribs adapted to fit into said recesses, cavities in the ends of said main halves, packing-strips also adapted to fit into said recesses and be clamped therein by said ribs, bolts uniting the two halves, end-packers composed of two halves overlapping each other at opposite points and provided with projections forming an annular flange, annular packing-rings fitting into the recesses in the ends of the main part, and bolts uniting the end-packers to said main part, the annular flanges on said end-packers forcing said end packing-rings into the recesses into the main part of said joint-closer, substantially as set forth.

2. The combination, with the main portion of a joint-closer for pipes, of end-closers composed of an annular packing-ring the ends whereof are divided and overlap each other as shown, and two halves also divided and overlapping each other and united to the main portion by bolts, the same being constructed and operating substantially as set forth.

In witness whereof I have hereunto set my hand and seal, at Indianapolis, Indiana, this 13th day of June, A. D. 1899.

WALTER D. BEAVER. [L. S.]

Witnesses:
JAMES A. WALSH,
C. S. FRYE.